(No Model.)
W. B. HAMMOND.
MACHINE FOR CUTTING RAILROAD RAILS.
No. 555,696. Patented Mar. 3, 1896.
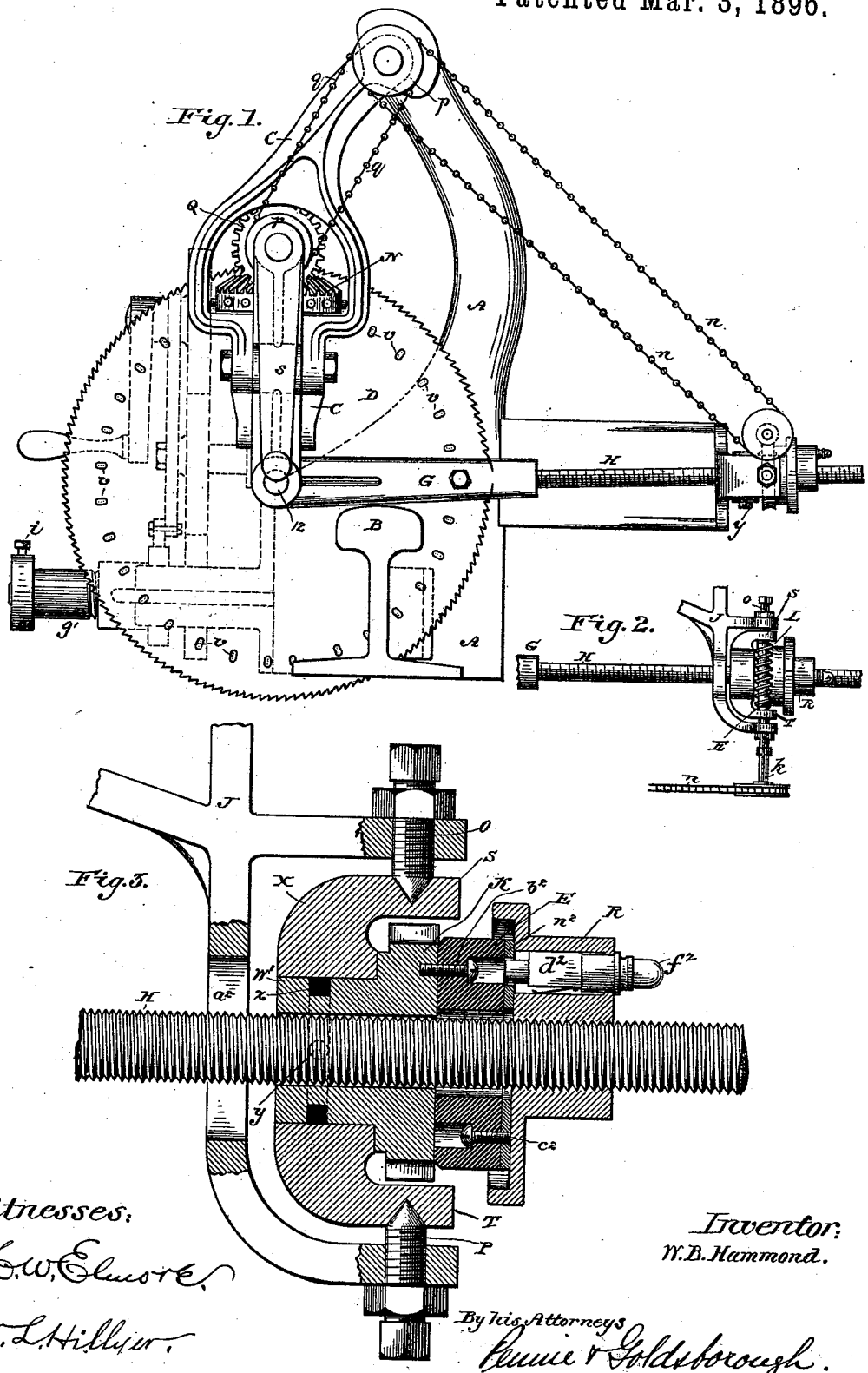

UNITED STATES PATENT OFFICE.

WILBERFORCE B. HAMMOND, OF BOSTON, MASSACHUSETTS, ASSIGNOR TO THE HIGLEY SAWING AND DRILLING MACHINE COMPANY, OF NEW YORK, N. Y.

MACHINE FOR CUTTING RAILROAD-RAILS.

SPECIFICATION forming part of Letters Patent No. 555,696, dated March 3, 1896.

Application filed May 26, 1891. Serial No. 394,221. (No model.)

*To all whom it may concern:*

Be it known that I, WILBERFORCE B. HAMMOND, a citizen of the United States, residing at Boston, in the county of Suffolk and State of Massachusetts, have invented certain new and useful Improvements in Machines for Cutting Railroad-Rails and other Substances; and I do hereby declare the following to be a full, clear, and exact description of the invention, such as will enable others skilled in the art to which it appertains to make and use the same.

My invention relates to certain new and useful improvements in machines for sawing railroad-rails and the like, and is particularly applicable to the type of machine illustrated and described in the patent of Eben N. Higley, No. 389,149, dated September 4, 1888. In the said patent to Higley a saw driven from apertures in its sides by gearing connected with a suitable source of power is journaled in a swinging frame pivoted to the main frame of the machine, and as the sawing operation progresses the swinging frame is fed forward by devices actuated from the power-transmitting mechanism, so as to cause the saw to be progressed constantly toward the work in proportion as the depth of the cut increases. The feeding devices for this purpose described and shown in the Higley patent referred to consist primarily of a screw-shaft projecting from a swinging frame and passing through a rotatable nut mounted in bearings forming a part of the main frame of the machine, said nut being rotated by means of a worm-shaft and sprocket-gearing actuated from the power-shaft of the machine, as will more fully appear upon reference to the drawings and specification forming a part of said patent. This arrangement is admirably adapted for securing the general result for which it is employed—namely, to feed the saw forward constantly toward the work. In practice, however, it has been found that with the employment of the specific construction of feeding mechanism described in the Higley patent the entire effective cutting-edge of the saw is only utilized when the saw-periphery is perfectly circular and the saw perfectly centered and of strictly uniform temper throughout and when the worm and pinion gear of the feed-shaft work with perfect accuracy. Should any of these conditions fail, it results (with the regular continuous feed of the Higley machine) that the saw cuts noticeably on only a portion of its periphery. A minute eccentricity of the saw, or even a slight unequal wear upon the teeth due to lack of uniformity of temper, produces results that become more and more aggravated as the sawing operation continues. It is manifestly impossible, however, to realize or to maintain these conditions in practice, or even to closely approximate them, except at disproportionate cost. It results, therefore, as only a part of the teeth are in effective operation, that the time required for sawing through a given thickness of metal is lengthened beyond the normal limit and that said teeth having all the work thrown upon them are rapidly dulled and rendered ineffective, while the unused or non-active teeth remain intact.

The object of my invention is to render available for cutting purposes every tooth of the saw in spite of the irregularities of contour, wear, or mounting referred to, and I effect this object by providing an elastic or resilient forward feed for the saw instead of the inflexible regular feed of the Higley machine. I preferably effect this purpose by inserting between the rotatable feed-nut and the driving mechanism therefor a resilient or flexible connection of such character as to transmit motion to the nut, and also to constantly press against the work those teeth which are in the saw-groove, whether said teeth be at the outermost line of the irregular periphery of the saw or within that line. An additional merit of this elastic or resilient construction is that it relieves the saw from the severe strains that would be put upon it should one of the teeth break or should chips lodge in the saw-grooves. Moreover, it eases the saw on its way through hard places in the material acted upon, permitting the spring at such times to store its energy so as to drive the saw forward faster when it reaches softer places in the material.

In carrying out my invention I have embodied the same in a form illustrated in the accompanying drawings, wherein—

Figure 1 represents a side elevation of a sawing-machine of the Higley type provided with my improvements. Fig. 2 represents in detail a plan view of my improvements, and Fig. 3 represents a horizontal sectional view of the same on an enlarged scale.

Similar letters of reference indicate similar parts throughout the several views.

Referring to the drawings, D represents a saw suspended in a swinging frame C and provided with peripheral holes $v$, adapted to be driven from pin-gearing N, connected by suitable gears Q to a suitable source of power. B represents the rail to be operated upon; G, the yoke; H, the feed-screw; $q\,q$ and $n\,n$, the sprocket-chains connecting the gear Q with the worm-shaft $k$ having the worm L. All of these parts are fully described and illustrated in the patent to Higley above referred to, and constitute one form of rail-sawing machine to which my improvement is adapted to be applied.

The worm L intermeshes with a gear or pinion K, said pinion having a hub portion $w'$ provided with an annular groove or recess $x$. The hub portion $w'$ fits within an appropriate opening in bearing X and is adapted to revolve freely within said bearing, but is held against longitudinal movement therein by means of a screw-pin $y$ playing within the groove $x$. The bearing X is provided with lugs S T, having conical recesses, as shown, for the reception of the conical ends of screws O P, forming pivotal supports upon which the bearing X is adapted to swing.

The screws O P are provided with set-nuts, as shown, whereby they may be locked in position in the bracket J, connected to the main frame A of the machine. The bracket J has a suitable opening $a^2$ for the purpose of giving the feed-shaft H sufficient play in the bracket J during the inward and outward swing of the swinging frame C.

Upon the feed-shaft H is mounted the interiorly-screw-threaded rotatable feed-nut R, said feed-nut being driven from the pinion K through the medium of a springy or resilient connection, permitting a limited horizontal movement of the nut toward and from said pinion, and thereby having the effect of spring-seating the entire swinging frame C and its saw. The special device for this purpose illustrated in the present application consists of a disk E, of india-rubber or the like, affixed to the outer face of the pinion K by means of countersunk screws, as $b^2$, and having a facing-plate or disk $n^2$, of steel, held in place by the countersunk screws $c^2$, the function of said steel facing-plate being to protect the disk E from abrasion by the nut R. The steel facing-plate is provided with an aperture, as shown, for the reception of a pin $d^2$, located in a suitable recess in the nut R and constituting a connection between said nut and the disk E. The pin $d^2$ is prevented from jarring out of its recess by means of the spring $e^2$, but may be withdrawn therefrom by means of the head $f^2$. The presence of the pin $d^2$ is not, however, indispensable to the operation of my invention, inasmuch as in many instances sufficient frictional contact can be secured between the steel facing-plate $n^2$ and the nut R to form a good driving connection for the latter. The pin $d^2$, nevertheless, serves as an additional connection between the nut and pinion, and acts as a safeguard against slipping or becoming too tightly crowded against the face-plate.

The operation of my invention will be clearly apparent. The power-transmitting gearing, of which the pinion K constitutes a part, imparts a movement of rotation to the nut R during the sawing operation. The feed-shaft H, which passes freely through openings in the pinion K, rubber disk E, and facing-plate $n^2$, is drawn forward by the feed-nut R, causing the saw to constantly progress within the saw-groove. The resiliency of the disk E compensates for any irregularities in the contour of the saw's periphery by permitting a slight longitudinal movement of the nut and consequently of the feed-shaft, so as to hold the saw-teeth against the work with a yielding spring-pressure, thereby insuring contact of each tooth with the work in passing through the saw-groove, whether said tooth be within or without the general periphery of the saw. The cutting effect of each tooth is accordingly utilized, the sawing operation finished in a correspondingly quicker time, the teeth are not liable to be broken by sudden action, and the life of the saw is greatly increased.

The leading characteristic of my invention consists in the fact that the feeding device for the saw is spring-seated and the saw not positively propelled or fed to its work, and I desire to be understood as claiming that feature broadly, together with the specific means herein described for embodying the same in practical form.

What I claim is—

1. A sawing-machine having a feed for the saw; power-transmitting gearing for actuating said feed; and a resilient connection between the power-transmitting gearing and feed; substantially as described.

2. A sawing-machine provided with a movable saw-frame; a feed-shaft connected thereto; a feed-nut for operating said shaft; power-transmitting gearing for actuating the feed-nut; and a resilient connection between the nut and power-transmitting gearing; substantially as described.

3. A sawing-machine provided with a movable saw-frame; a feed-shaft secured thereto; a hollow pinion through which said feed-shaft passes, said pinion constituting a part of the power-transmitting gearing for operating the feed; a feed-nut mounted upon the feed-shaft; and a resilient connection between the pinion and feed-nut; substantially as described.

4. A sawing-machine provided with a swinging saw-frame; a feed-shaft secured thereto; a hollow pinion through which said feed-shaft passes, said pinion constituting a part of the power-transmitting gearing for operating the feed; a swinging yoke within which said pinion is mounted; a feed-nut mounted upon the feed-shaft; and a resilient connection between the pinion and feed-nut; substantially as described.

5. A sawing-machine provided with a swinging saw-frame; a feed-shaft secured thereto; a hollow pinion through which said feed-shaft passes, said pinion constituting a part of the power-transmitting gearing for operating the feed; a swinging yoke within which said pinion is mounted; a feed-nut mounted upon the feed-shaft; a rubber disk connected to the pinion and having a metallic facing-plate; said disk being located between the pinion and feed-nut; substantially as described.

6. A sawing-machine provided with a swinging saw-frame; a feed-shaft secured thereto; a hollow pinion through which the feed-shaft passes, said pinion constituting a part of the power-transmitting gearing for operating the feed; a swinging yoke within which said pinion is mounted; a feed-nut mounted upon the feed-shaft; a rubber disk connected to the pinion and having a metallic facing-plate provided with an aperture, said disk being located between the pinion and feed-nut; and a pin for connecting the facing-plate and the feed-nut; substantially as described.

In testimony whereof I affix my signature in presence of two witnesses.

WILBERFORCE B. HAMMOND.

Witnesses:
WILLIAM E. ROGERS,
L. L. STIMPSON.